(12) United States Patent
Spector et al.

(10) Patent No.: US 11,907,577 B2
(45) Date of Patent: Feb. 20, 2024

(54) COMMAND QUEUING FOR DATA STORAGE DEVICES

(71) Applicant: Western Digital Technologies, Inc., San Jose, CA (US)

(72) Inventors: Tomer Spector, Kibbutz Ginegar (IL); Doron Ganon, Kfar Vradim (IL); Eran Arad, Yuvalim (IL)

(73) Assignee: Western Digital Technologies, Inc., San Jose, CA (US)

( * ) Notice: Subject to any disclaimer, the term of this patent is extended or adjusted under 35 U.S.C. 154(b) by 121 days.

(21) Appl. No.: 17/543,434

(22) Filed: Dec. 6, 2021

(65) Prior Publication Data

US 2023/0176781 A1     Jun. 8, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 7,363,391 B2 | 4/2008 | Shimizu et al. | |
| 9,304,692 B2 | 4/2016 | Nguyen et al. | |
| 9,424,206 B2 | 8/2016 | Tseng et al. | |
| 10,664,167 B2 | 5/2020 | Tseng | |
| 2015/0301763 A1* | 10/2015 | Shaharabany | G06F 12/0246 711/147 |
| 2016/0062657 A1* | 3/2016 | Shinaar | G06F 3/0607 711/103 |
| 2019/0243571 A1* | 8/2019 | Narayanan | G06F 3/0673 |
| 2019/0265909 A1* | 8/2019 | Frolikov | G06F 3/0659 |
| 2022/0342703 A1* | 10/2022 | Hong | G06F 9/5011 |
| 2022/0398038 A1* | 12/2022 | Anchi | G06F 3/0611 |
| 2023/0068605 A1* | 3/2023 | Sankaranarayanan | G06F 3/0679 |

FOREIGN PATENT DOCUMENTS

CN     102609222 B     3/2015

* cited by examiner

*Primary Examiner* — Tracy A Warren
(74) *Attorney, Agent, or Firm* — Barry IP Law, P.C.

(57) ABSTRACT

A plurality of commands is received from at least one application. A command of the plurality of commands is to be performed by a Data Storage Device (DSD) after one or more conditions have been satisfied by the DSD. The plurality of commands is enqueued and the command is enqueued with the one or more conditions for performing the command. It is determined whether the one or more conditions have been satisfied by the DSD, and in response to determining that the one or more conditions have been satisfied by the DSD, the command is sent to the DSD for performance of the command.

20 Claims, 7 Drawing Sheets

COMMAND QUEUING FOR DATA STORAGE DEVICES

BACKGROUND

Data Storage Devices (DSDs), such as Hard Disk Drives (HDDs) or Solid-State Drives (SSDs), typically receive commands from hosts to write data to or read data from the DSD. In some cases, a command may need to wait at the host until a particular condition has been satisfied by the DSD. One example condition can include a host platform that limits a queue depth for the commands to be performed by the DSD. When an execution engine of the host receives a command that requires a condition to be satisfied before the command can be performed, the execution engine passes control back to the application issuing the command to wait for the condition to be met before proceeding with queuing commands to be sent from the application to the DSD. This suspension in the queuing of commands by the execution engine can create a significant delay in execution since only once the condition is met can subsequent commands be queued by the execution engine to send to the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Examples

Figure 1:
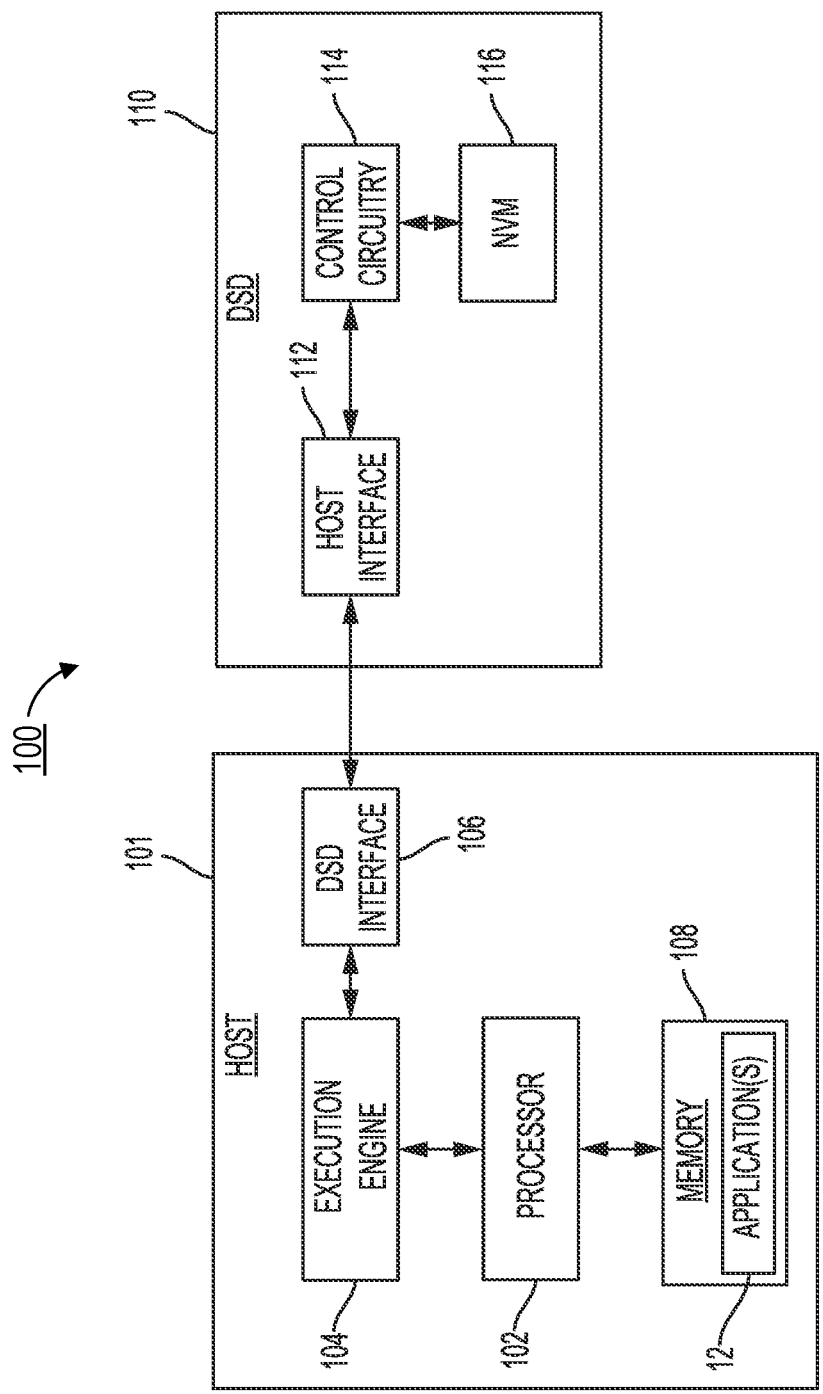
FIG. 1 is a block diagram of a system including a host and a Data Storage Device (DSD) according to one or more embodiments.

FIG. 1 is a block diagram of system 100 including host 101 and Data Storage Device (DSD) 110 according to one or more embodiments. As shown in FIG. 1, host 101 includes processor 102, memory 108, and DSD interface 106. Processor 102 can execute instructions, such as instructions from one or more applications 12. Processor 102 can include circuitry such as a Central Processing Unit (CPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System on a Chip (SoC), which may be combined with one or both of memory 108 and DSD interface 106.

Memory 108 can be used by host 101 to store data used by processor 102. Data stored in memory 108 can include instructions loaded from DSD 110 for execution by processor 102, and/or data used in executing instructions from one or more applications 12. In some implementations, memory 108 can be a volatile memory, such as a Dynamic Random Access Memory (DRAM).

DSD interface 106 is configured to interface host 101 with DSD 110 and may communicate with DSD 110 using a standard such as, for example, Universal Flash Storage (UFS), Serial Advanced Technology Attachment (SATA), PCI express (PCIe), Small Computer System Interface (SCSI), Serial Attached SCSI (SAS), Ethernet, Fibre Channel, or WiFi. In this regard, host 101 and DSD 110 may not be physically co-located and may communicate over a network such as a Local Area Network (LAN) or a Wide Area Network (WAN), such as the internet. In addition, DSD interface 106 may also interface with DSD 110 using a logical interface specification such as UFS Host Controller Interface (UFSHCI), Non-Volatile Memory express (NVMe) or Advanced Host Controller Interface (AHCI). As will be appreciated by those of ordinary skill in the art, DSD interface 106 can be included as part of processor 102.

Execution engine 104 of host 101 can include hardware and/or software that queues commands from one or more applications 12 to be sent to DSD 110. In some implementations, execution engine 104 can include a hardware accelerator, such as an ASIC or Graphic Processing Unit (GPU) that enqueues the commands in a local memory (e.g., memory 105 in FIG. 4). In other implementations, execution engine 104 may be implemented by processor 102 and use a different memory of host 101, such as memory 108, to enqueue commands to be sent to DSD 110.

As discussed in more detail below with reference to FIGS. 3 to 6B, execution engine 104 may enqueue commands with the condition or conditions to be performed by DSD 110 for the command before sending the command to DSD 110. Execution engine 104 may also determine whether a condition has been satisfied by DSD 110 using DSD interface 106 and allow additional commands from one or more applications 12 to be enqueued while the command and its condition or conditions remain queued. This arrangement can improve the performance of system 100 by allowing commands from application or applications 12 to continue to be enqueued by execution engine 104 even though one or more commands in the queue wait for a condition or conditions to be satisfied by DSD 110.

DSD 110 can include, for example, a Hard Disk Drive (HDD), a Solid-State Drive (SSD), or a Solid-State Hybrid Drive (SSHD). In this regard, NVM 116 of DSD 110 can include, for example, one or more rotating magnetic disks and/or non-volatile solid-state memory, such as flash memory. In some implementations, NVM 116 can include multiple HDDs and/or SSDs.

While the description herein refers to solid-state memory generally, it is understood that solid-state memory may comprise one or more of various types of memory devices such as flash integrated circuits, Chalcogenide RAM (C-RAM), Phase Change Memory (PC-RAM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, EEPROM, Ferroelectric Memory (FeRAM), Magnetoresistive RAM (MRAM), 3D XPoint memory, other discrete NVM (non-volatile memory) chips, or any combination thereof.

Control circuitry 114 can include circuitry such as one or more processors for executing instructions and can include a microcontroller, a DSP, an ASIC, an FPGA, hard-wired logic, analog circuitry and/or a combination thereof. In one implementation, control circuitry 114 can include an SoC, which may also include a local memory of DSD 110 and/or host interface 112 for communicating with host 101.

Host interface 112 is configured to interface DSD 110 with host 101, and may interface using, for example, UFS, SATA, PCIe, SCSI, SAS, Ethernet, or WiFi, and/or one or more other standards. As will be appreciated by those of ordinary skill in the art, host interface 112 can be included as part of control circuitry 114.

As will be appreciated by those or ordinary skill in the art, other implementations of DSD 110 and host 101 may include a different arrangement of modules and/or components than those shown in FIG. 1. For example, in some implementations, the components of DSD 110 and host 101 may be housed in a single device, as opposed to having a separate host and DSD. In yet other implementations, execution engine 104 may be a module executed by processor 102 of host 101, rather than a separate physical component, such as a separate hardware accelerator of host 101.

Figure 2:
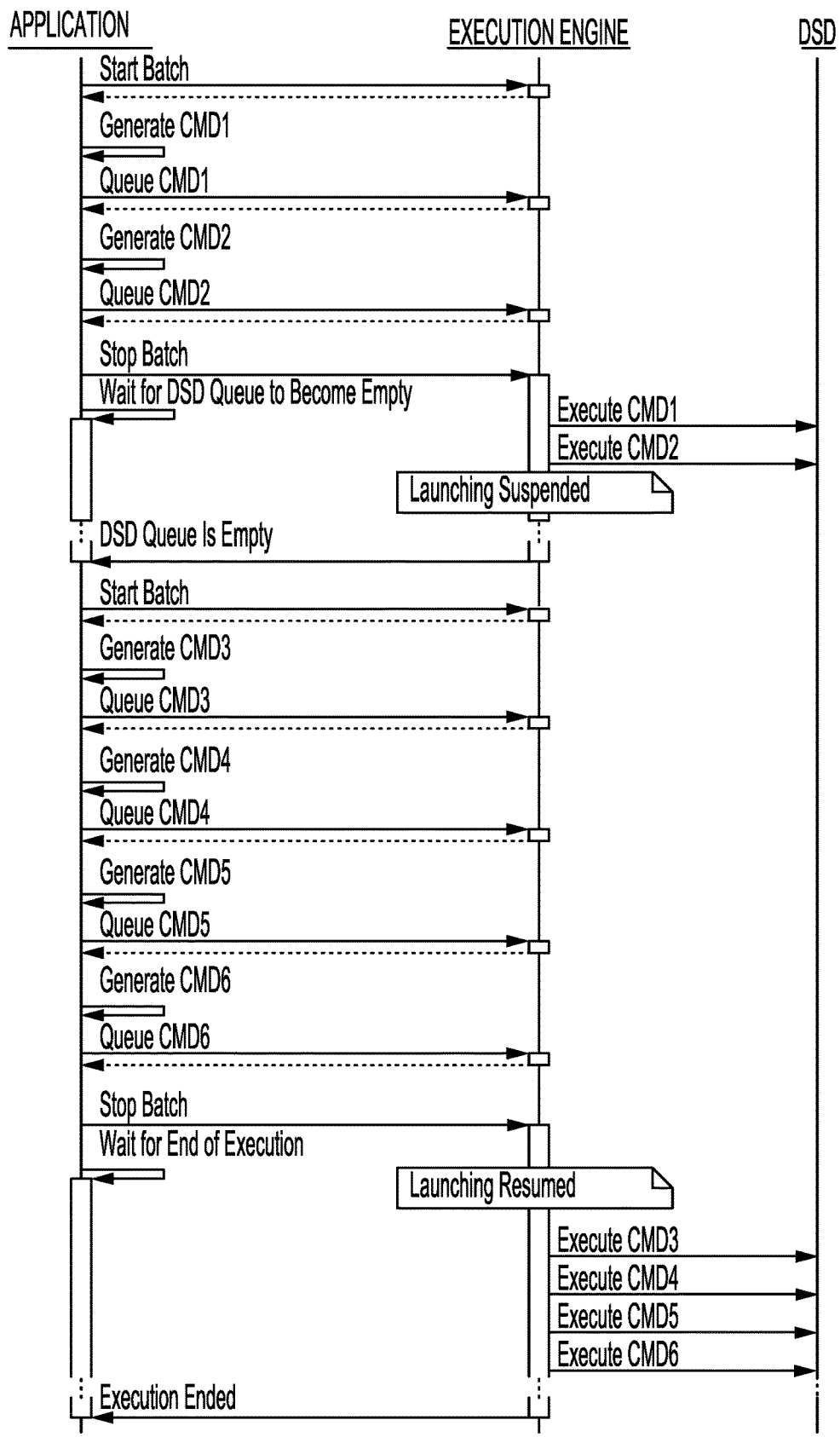
FIG. 2 is a sequence diagram for an example of queuing commands according to the prior art.

FIG. 2 is a sequence diagram for an example of queuing commands according to the prior art. As shown in FIG. 2, commands whose execution depend on a condition, such as CMD 3 in FIG. 2, are not part of a series of commands or batch of commands queued in advance by the execution engine. Instead, when execution reaches a command whose performance depends on a condition, the execution engine passes control back to the application to wait for the specific condition to be met before proceeding with execution of any of the commands. This suspension of execution introduces a significant delay in execution since only once the condition is met can the conditional command and all the commands that follow it be enqueued by the execution engine.

In the example of FIG. 2, a batch of commands is started by an application that generates commands 1 and 2 (i.e., CMD1 and CMD2 in FIG. 2), which are each sent to the execution engine of the host for enqueueing before sending the commands to be performed by a DSD. The execution engine acknowledges to the application that each of CMD 1 and CMD2 have been enqueued. The application then stops the batch to wait for the performance of CMD1 and CMD2 by the DSD since CMD3 is conditioned on the queue at the execution engine being empty.

The execution engine sends CMD 1 and CMD2 to the DSD for performance and reports back to the application when the queue for the DSD has become empty. In response, the application starts a new batch of commands and generates CMD3 after the execution engine acknowledges the start of the new batch of commands. The application sends CMD3 to the execution engine to be enqueued and generates CMD4 after CMD3 has been acknowledged as enqueued by the execution engine.

Similarly, the application sequentially generates and sends CMD5 and CMD6 to the execution engine to be enqueued for performance by the DSD. The application then notifies the execution engine that the batch of commands has ended, and the execution engine resumes launching or sending the queued commands to the DSD for execution. After the execution engine determines that all the commands have been performed by the DSD, such as by one or more acknowledgements received from the DSD, the execution engine notifies the application that execution of the commands has ended.

Figure 3:
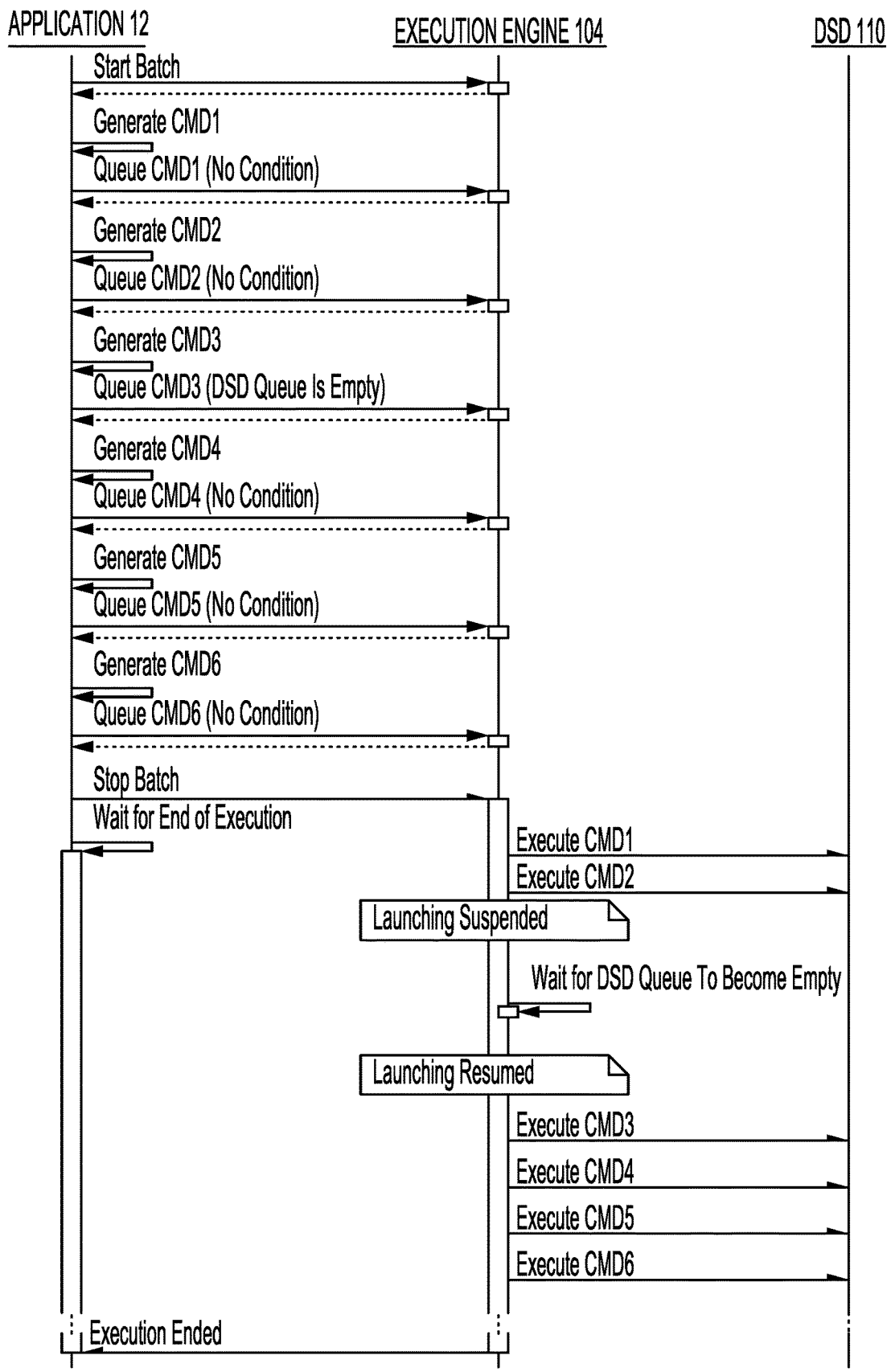
FIG. 3 is a sequence diagram for an example of queuing commands according to one or more embodiments.

In contrast to the prior art sequence of FIG. 2, the execution engine in the sequence of FIG. 3 enqueues the condition required for the performance of CMD3 with the command so that a single batch of commands for CMDs 1 to 6 can be sent from application 12 to execution engine 104. This improves system performance by not having to suspend the launching of commands to DSD 110 and returning control back to application 12 to wait for the condition to be satisfied before starting a new batch of commands. In other words, the arrangement of FIG. 3 reduces a layer of delay and communication between execution engine 104 and application 12 by having execution engine 104 enqueue commands with conditions for performing the commands and determining when such conditions have been satisfied by DSD 110.

As shown in the example of FIG. 3, application 12 starts the batch of commands and sequentially generates and sends commands for the batch to execution engine 104. CMDs 1 to 6 are sequentially enqueued by execution engine 104, and the condition for CMD3 is enqueued with the command so that execution engine 104 can determine when the condition for CMD3 (i.e., the DSD queue empty) is met without returning control back to application 12 and interrupting the enqueuing of commands at execution engine 104.

After application 12 has finished generating and sending the batch of CMDs 1 to 6 to execution engine 104, application 12 sends a stop batch message to execution engine 104. In response, execution engine 104 sequentially sends commands from the queue to DSD 110 for performance. When execution engine 104 reaches CMD3 in the queue, execution engine 104 determines whether the condition of an empty queue for performing CMD3 has been satisfied by DSD 110. Execution engine 104 waits until the condition is satisfied, and then resumes sending commands to DSD 110 by sending CMD3 without having to report back to application 12 or wait for new instructions from application 12. CMDs 4 to 6 are then sent to DSD 110 for execution and execution engine 104 can notify application 12 of the performance of the commands based on information obtained from DSD 110, such as from DSD interface 106.

Those of ordinary skill in the art will appreciate with reference to the present disclosure that other implementations may differ from the example sequence of FIG. 3. In this regard, some implementations may send groups of commands to DSD 110 in a single transmission for performance, such as CMDs 1 and 2 in a first transmission and CMDs 3 to 6 in a second transmission. As another example variation, commands that are not dependent on a condition for performance may include a flag or other indicator of no condition when sent from application 12 to execution engine 104.

Figure 4:
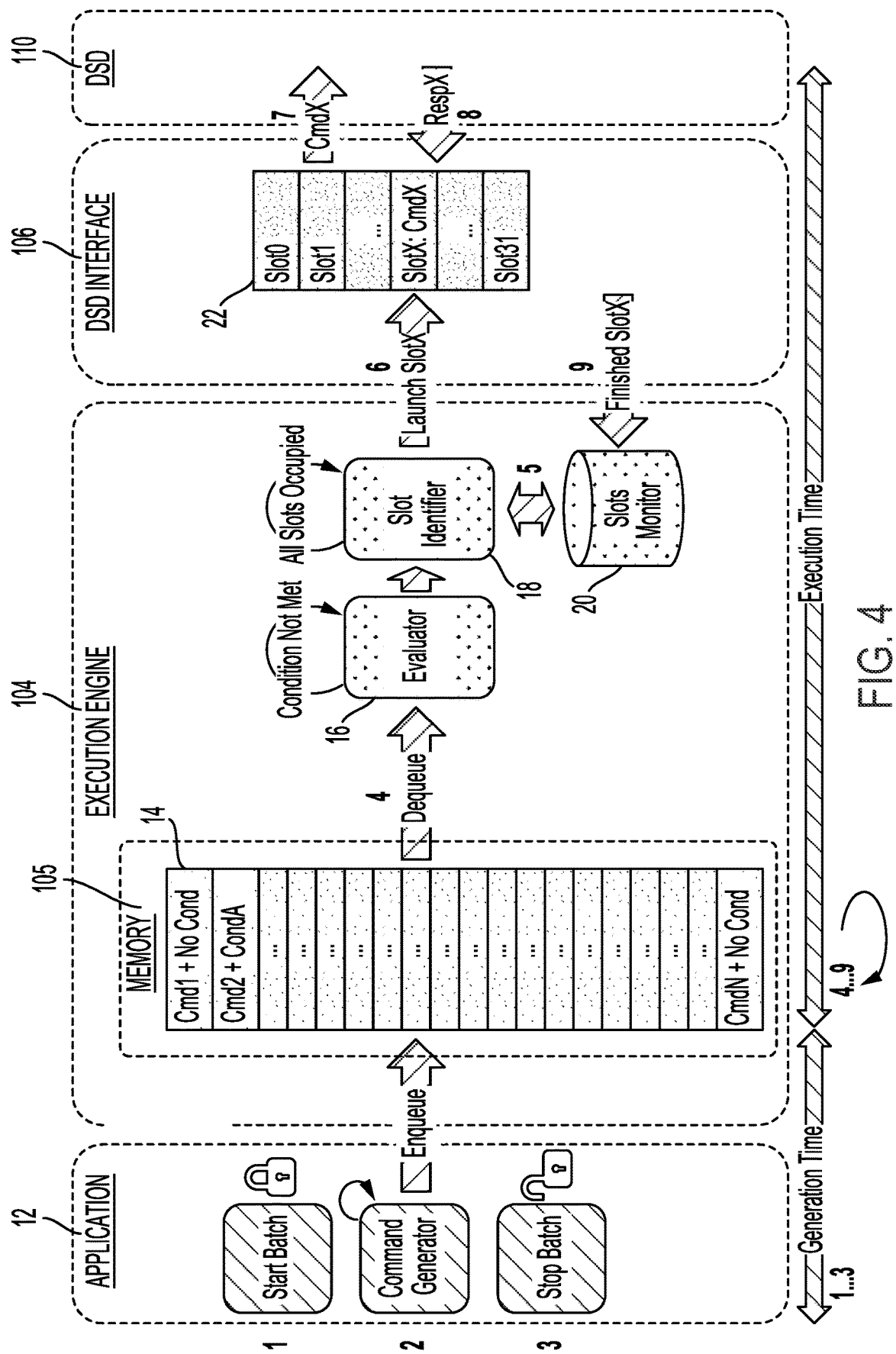
FIG. 4 is a block diagram of an example environment for implementing the queuing of commands with one or more conditions according to one or more embodiments.

FIG. 4 is a block diagram of an example environment for implementing the queuing of commands with one or more conditions according to one or more embodiments. As shown in FIG. 4, application 12 starts a batch of commands at the time indicated in FIG. 4 as "1" and generates commands to be enqueued by execution engine 104 at time 2. The commands generated by application 12 are enqueued by execution engine 104 in queue 14 as they are received from application 12. The batch of commands is stopped by application 12 at time 3, which concludes the command generation time. This arrangement illustrates an improvement in performance from the prior art example sequence of FIG. 2 in that even though one or more of the commands generated by application 12 in FIG. 4 may include one or more conditions for performance, application 12 is not interrupted in generating the commands and additional communication between execution engine 104 and application 12 is not needed to enqueue all the commands for the batch.

For its part, execution engine 104 enqueues the commands it receives from application 12 in queue 14, which may be stored in a memory of host 101. In the example of FIG. 4 execution engine 104 is a hardware accelerator, such as an ASIC of host 101, that has its own local memory 105 that is used for enqueuing the commands. Notably, the number of commands that may be enqueued by execution engine 104 may only be limited by the amount of memory available for queue 14, which can allow for more commands to be enqueued than for currently used standards, such as UFSHCI, which has a maximum queue depth of 32 commands. For example, thousands of commands can be enqueued in memory 105 at execution engine 104 to significantly improve the performance of the system over conventional systems such as those described with reference to FIG. 2 discussed above.

In some implementations, memory 105 of execution engine 104 may be a volatile memory, such as DRAM or Static Random Access Memory (SRAM). In other implementations, memory 105 may be a Storage Class Memory (SCM) that may allow for relatively quick storage and retrieval of the commands. In some implementations, such as where execution engine 104 is implemented by processor 102 in FIG. 1, queue 14 may instead be stored in a main memory of host 101, such as memory 108 in FIG. 1.

In the example of FIG. 4, the queued commands and their associated condition or conditions, if any, are stored together in queue 14 where each command and its respective condition or conditions, if any, form an entry in the queue. In other implementations, an entry in queue 14 may only store the command and a pointer to a condition, a flag, or other indicator of a particular condition, which may be locally stored at execution engine 104. As shown in FIG. 4, CMD2 in the queue includes a condition A (i.e., "CondA") while other commands in the queue do not include a condition. Commands without preconditions for performance may not include anything other than the command in the queue or may alternatively include an indicator or other flag indicating that there is no condition required for sending the command to DSD 110.

When execution engine 104 dequeues the commands in the queue at time 4, evaluator module 16 of execution engine 104 determines whether the condition for the dequeued command, if any, has been met. In some implementations execution engine 104 and/or DSD interface 106 of host 101 monitors the status of a queue of pending commands at DSD 110 to determine if the condition has been satisfied.

If the condition has been met or there is not a condition for the command, slot identifier module 18 of execution engine 104 using slots monitor 20 finds an empty slot at time 5 for commands to be transmitted to DSD 110. In this regard, DSD interface 106 receives acknowledgments or other information from DSD 110 concerning the completion of commands by DSD 110 and/or the status of a queue of pending commands at DSD 110, which is used by DSD interface 106 to update the slots 22 shown in FIG. 4 and provide this information to execution engine 104 for slot monitor 20.

When an empty slot is found by slot identifier module 18, execution engine 104 sends the command to DSD interface 106 at time 6 (i.e., "Launch SlotX" in FIG. 4), and DSD interface 106 sends the command to DSD 110 for performance at time 7 (i.e., "CmdX" in FIG. 4). In the example of FIG. 4, slots 22 at DSD interface 106 may represent a limit of 32 pending commands in accordance with a Universal Flash Storage (UFS) specification implemented by DSD 110 and DSD interface 106. DSD 110 acknowledges performance of the command at time 8 (i.e., "RespX" in FIG. 4) and DSD interface 106 updates execution engine 104 with the available slot at time 9 (i.e., "Finished SlotX" in FIG. 4) that was previously held by the completed command. As shown in the example of FIG. 4, times 4 to 9 represent the execution time for the batch of commands.

As with the improvement in performance discussed above for application 12 by generating a single batch of commands, the performance of execution engine 104 is also improved by enqueuing the commands with their conditions at execution engine 104 and using execution engine 104 to determine whether the conditions have been satisfied. Execution engine 104 in this arrangement does not have to stop enqueuing commands and perform additional communication with application 12 for a command that has a condition. This significantly reduces the processing time for a batch of commands that includes conditioned commands over the prior art example discussed above with reference to FIG. 2.

Those of ordinary skill in the art will appreciate with reference to the present disclosure that other implementations may include different components, modules, data structures, or arrangements than those shown in FIG. 4. For example, some implementations may enqueue the commands in a different memory or may use a different data structure for conditions. As another example variation, evaluator module 16, slot identifier module 18, and/or slots monitor 20 may be combined in other implementations, or slots monitor 20 may be implemented by DSD interface 106 instead of by execution engine 104.

Example Processes

Figure 5:
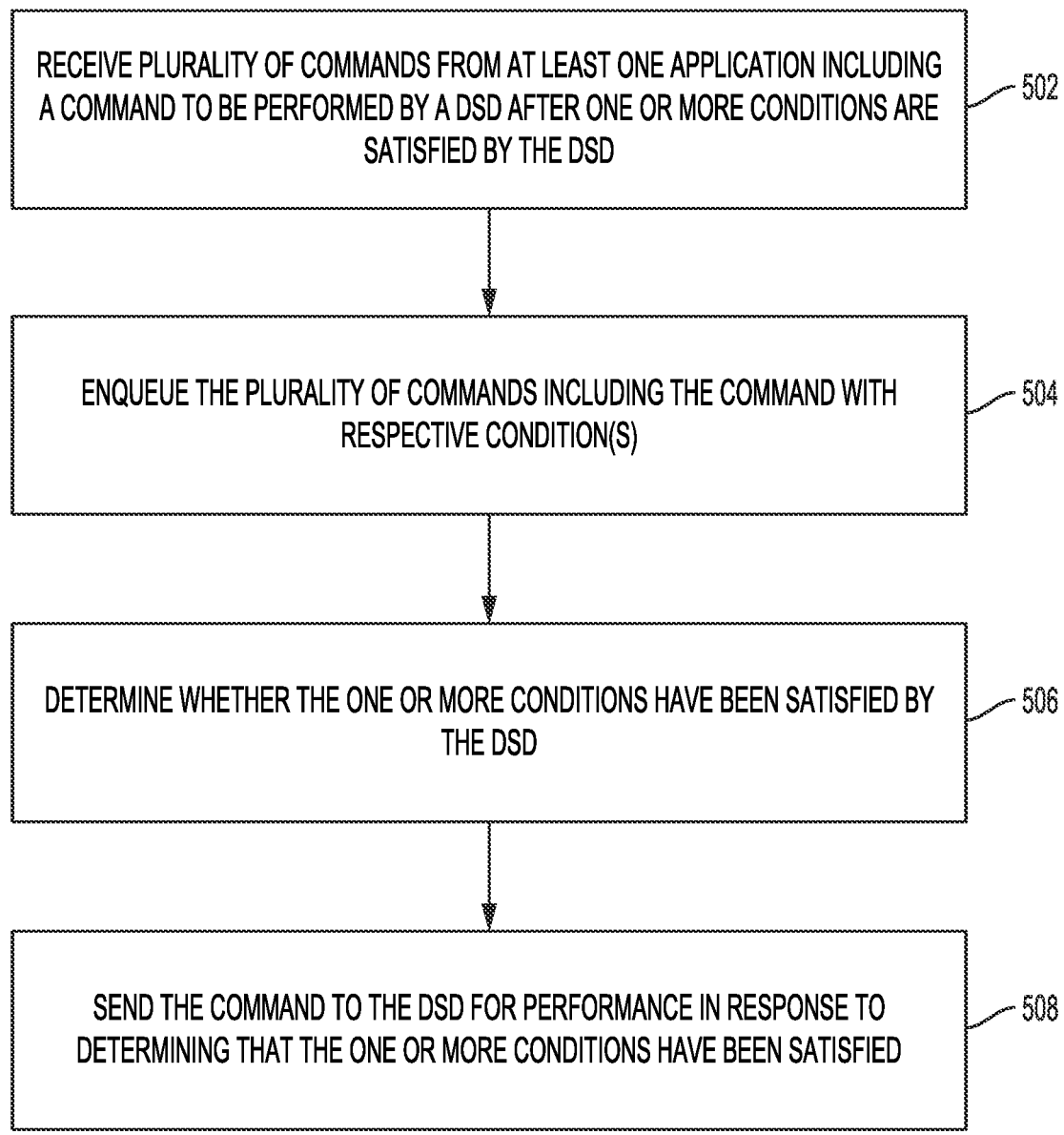
FIG. 5 is a flowchart for a command queuing process according to one or more embodiments.

FIG. 5 is a flowchart for a command queuing process according to one or more embodiments. The process of FIG. 5 can be performed by a host, such as host 101 in FIG. 1.

In block 502, an execution engine of a host (e.g., execution engine 104 in FIGS. 1 and 3) receives a plurality of commands from at least one application executed by the host. At least one of the received commands is to be performed by a DSD after one or more conditions have been satisfied by the DSD. In some cases, the condition can include an empty queue of pending commands at the DSD, as discussed above with reference to FIG. 3. Other conditions may be used, such as a number of pending commands already queued and/or the availability of other resources of the DSD, such as processing or memory resources. In some cases, the condition or conditions may be dependent upon the completion of another command or a state of the DSD, such as an idle state of the DSD where there are no other pending commands. In addition, some commands may be dependent upon more than one condition for performance.

In some implementations, the condition can include that a number of pending commands at the DSD is less than or equal to a predetermined number of pending commands. For example, a host platform may limit the number of pending commands at the DSD to eight pending commands. The condition in this example for performing the command can be that there are seven or less pending commands at the DSD. Each command sent to the execution engine from the application can include this condition to ensure that the limit of eight pending commands is not exceeded at the DSD. Since the execution time of commands by the DSD may not be known to the application in advance and may depend on characteristics of the DSD or varying workloads at the DSD, this condition may otherwise significantly delay an application in conventional systems where the execution engine returns control back to the application to wait for the condition to be satisfied without the execution engine determining whether the condition is satisfied. In other words, an application running on a conventional host may need to wait for confirmation that there are seven or less pending commands at the DSD before generating and sending the next command to the execution engine.

In contrast, the execution engine in block 504 of the process of FIG. 5 enqueues the plurality of received commands including the commands with their respective conditions, if any. The commands can be enqueued in a queue stored in, for example, a local memory of the execution engine (e.g., memory 105 in FIG. 5) or another memory of the host (e.g., memory 108 in FIG. 1). In some implementations, the queue can include a data structure that also stores the condition or conditions in an entry for the command. In other implementations, a flag, pointer, or other indicator may be used to indicate the condition or conditions to be satisfied by the DSD before performance of the command.

In block 506, the execution engine of the host determines whether the one or more conditions have been satisfied by the DSD. The execution engine can dequeue the commands in the order the commands were received and determine whether there is a condition or conditions that need to be satisfied for the dequeued command. In the examples of determining whether a queue of pending commands for the DSD is empty or that such a queue has less than or equal to a predetermined number of pending commands, the execution engine may check a data structure stored at the execution engine or at a DSD interface of the host to determine whether the queue of pending commands at the DSD satisfies the condition.

In block 508, the host sends the command to the DSD for performance in response to determining that the one or more conditions have been satisfied by the DSD. In some implementations, the execution engine may identify an available slot for the command as discussed above with reference to the example of FIG. 4. The command may be sent to the DSD for performance via the DSD interface of the host.

Those of ordinary skill in the art will appreciate with reference to the present disclosure that the order of blocks for the queuing process of FIG. 5 may differ in other implementations. For example, the receipt of commands in block 502 may overlap with the enqueuing of commands in block 504.

Figure 6A:
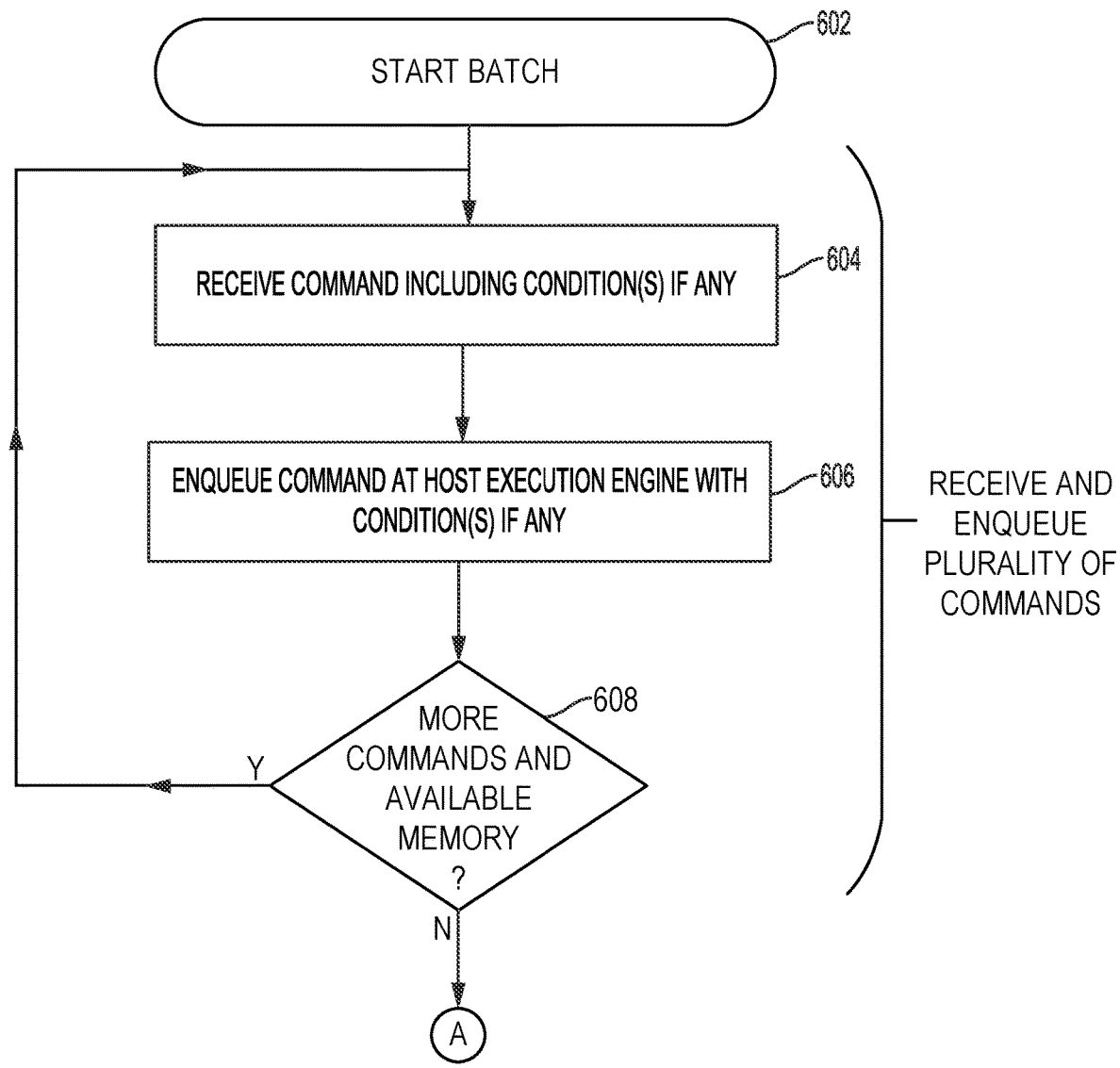
FIG. 6A is a flowchart for a first portion of a command queuing batch process according to one or more embodiments.
Figure 6B:
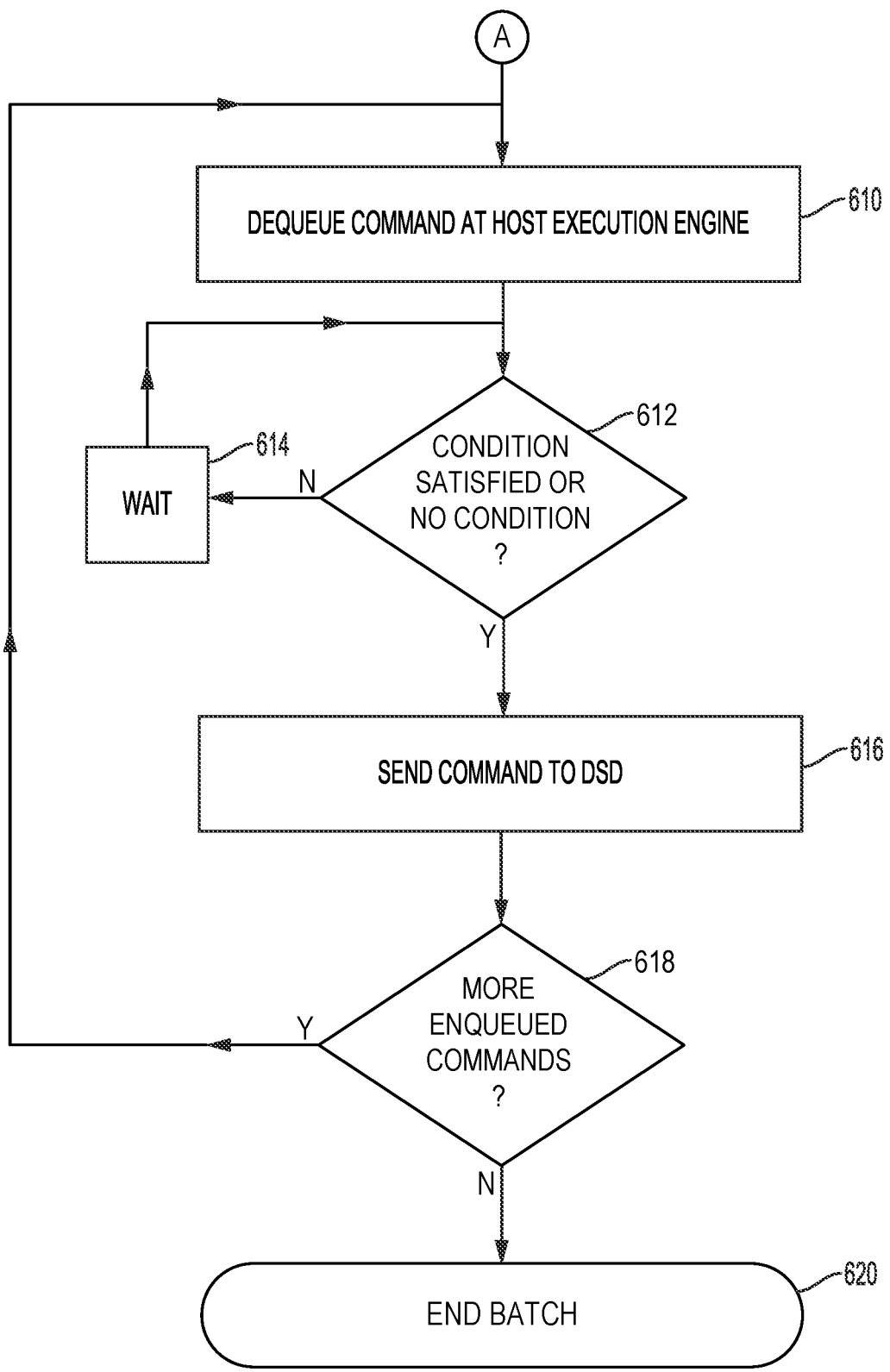
FIG. 6B is a flowchart for a second portion of the command queuing batch process of FIG. 6A.

FIGS. 6A and 6B provide a flowchart for a command queuing batch process according to one or more embodiments. The process of FIGS. 6A and 6B can be performed by, for example, an execution engine of a host, such as execution engine 104 discussed above.

In block 602, a batch of commands is started, such as by an application executed at the host. In some implementations, the execution engine may receive an indication from the application that the batch of commands has begun as in the example of FIG. 3 discussed above.

In block 604, the execution engine receives a command including any conditions that may be required for performance of the command. The command and its condition or conditions, if any, are enqueued by the execution engine in block 606. In block 608, the execution engine determines whether there are any more commands in the batch and whether there is still enough memory or available space in the queue for enqueuing additional commands. In some implementations, the execution engine may not check the available memory in block 608 where there is a large amount of memory available to queue the commands. Similarly, the execution engine may not check whether there are more commands in the batch in block 608 but may instead rely on the application to indicate the end of the batch of commands.

If it is determined that there are more commands in the batch and available memory in block 608, the process returns to block 604 to receive the next command with any condition or conditions required for performing the command. The series of blocks 604 to 608 may correspond to receiving and enqueuing of a plurality of commands as discussed above for blocks 502 and 504 in FIG. 5.

On the other hand, if it is determined that there are not more commands or that there is not more available memory in block 608, the process continues to block 610 in FIG. 6B to dequeue the first command at the host execution engine. The first command dequeued by the execution engine can correspond to the first command enqueued by the execution engine for the batch of commands. In some implementations, the dequeuing of commands in block 610 can be performed in parallel with the enqueuing of commands in blocks 604 to 608.

In block 612, the execution engine determines whether there is no condition for performing the command, or if there is a condition or conditions included with the command, whether the condition or conditions have been satisfied. As noted above, the conditions can include, for example, whether a queue at the DSD of pending commands is empty, that a number of pending commands at the DSD is less than or equal to a predetermined number of pending commands (e.g., seven or less pending commands), that another command has been performed, a state of the DSD (e.g., an idle state), and/or the availability of another resource at the DSD such as available memory or processing availability.

If it is determined in block 612 that the condition or conditions for the command are not satisfied, the process waits for a predetermined period at block 614 and returns to block 612 to check if the condition or conditions have been satisfied. In some implementations, the execution engine may determine whether the condition or conditions have been satisfied by checking a data structure at the execution engine or communicating with a DSD interface of the host to determine the status of a queue of pending commands at the DSD.

In response to determining that the command or commands have been satisfied in block 612, the process continues to block 616 to send the command to the DSD. The command can be sent, for example, by assigning the command to a slot at the DSD interface, which sends the command to the DSD for performance. In block 618, the execution engine determines whether there are more enqueued commands for the batch. If so, the process returns to block 610 to dequeue the next command. If there are not more commands enqueued for the batch at the execution engine, the process of FIGS. 6A and 6B ends in block 620.

Those of ordinary skill in the art will appreciate with reference to the present disclosure that the order of blocks for the command queuing batch process of FIGS. 6A and 6B may differ in other implementations. For example, commands may be enqueued in blocks 604 to 608 while other commands are dequeued in block 601.

As discussed above, the foregoing use of an execution engine at the host to enqueue commands with conditions and determine whether the conditions have been satisfied by the DSD can improve the performance of the system by not having to stop the batch of commands from the application. In this regard, the application does not have to wait for the DSD interface or the execution engine to inform the application that a condition has been satisfied before generating additional commands and starting a new batch. In addition, the execution engine does not have to stop enqueuing commands and communicate with the application when the execution engine reaches a command with a condition. Instead, the execution engine can continue to enqueue commands while it determines whether the condition has been satisfied.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a Microprocessor Unit (MPU), a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuitry or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A method, comprising:
   receiving a batch of commands from at least one application, wherein the commands in the batch of commands are to be sequentially sent from a host to a Data Storage Device (DSD) for performance of the commands including a command to be performed by the DSD after one or more conditions have been satisfied by the DSD;
   enqueuing the batch of commands in a queue at the host to sequentially send the commands from the host to the DSD, wherein the command is enqueued in the queue with the one or more conditions for performing the command;
   determining whether the one or more conditions have been satisfied by the DSD before sending the command to the DSD; and
   in response to determining that the one or more conditions have been satisfied by the DSD, sending the command in sequence from the queue to the DSD for performance of the command.

2. The method of claim 1, wherein the batch of commands is enqueued by an execution engine of the host.

3. The method of claim 2, wherein the execution engine is a hardware accelerator of the host.

4. The method of claim 2, wherein the execution engine determines whether the one or more conditions have been satisfied.

5. The method of claim 1, further comprising enqueuing at least one additional command received from the at least one application while the command and the one or more conditions remain enqueued.

6. The method of claim 1, wherein the one or more conditions provide that a DSD queue at the DSD of pending commands to be performed by the DSD is empty.

7. The method of claim 1, wherein the one or more conditions provide that a number of pending commands at the DSD is less than or equal to a predetermined number of pending commands.

8. The method of claim 1, wherein an interface of the host tracks a status of the DSD to determine whether a condition of the one or more conditions is satisfied.

9. A host, comprising:
   a processor configured to execute at least one application;
   an interface configured to send commands to a Data Storage Device (DSD); and
   means for:
   receiving a batch of commands from at least one application, wherein the commands in the batch of commands are to be sequentially sent from the host to the DSD for performance of the commands including a command to be performed by the DSD after one or more conditions have been satisfied by the DSD;

enqueuing the batch of commands in a queue at the host to sequentially send the commands from the host to the DSD, wherein the command is enqueued in the queue with the one or more conditions for performing the command;

determining whether the one or more conditions have been satisfied by the DSD before sending the command to the DSD; and in response to determining that the one or more conditions have been satisfied by the DSD, sending the command in sequence from the queue to the DSD via the interface for performance of the command.

10. The host of claim 9, wherein the batch of commands is enqueued by an execution engine of the host.

11. The host of claim 10, wherein the execution engine is a hardware accelerator of the host.

12. The host of claim 10, wherein the execution engine determines whether the one or more conditions have been satisfied.

13. The host of claim 9, wherein the one or more conditions provide that a DSD queue at the DSD of pending commands to be performed by the DSD is empty.

14. The host of claim 9, wherein the one or more conditions provide that a number of pending commands at the DSD is less than or equal to a predetermined number of pending commands.

15. The host of claim 9, wherein the interface tracks a status of the DSD to determine whether a condition of the one or more conditions has been satisfied.

16. A non-transitory computer-readable storage medium storing computer-executable instructions, wherein when the computer-executable instructions are executed by a processor of a host, the computer-executable instructions cause the host to:

receive a batch of commands from at least one application executed by the host, wherein the commands in the batch of commands are to be sequentially sent from the host to a Data Storage Device (DSD) for performance of the commands including a command to be performed by the DSD after one or more conditions have been satisfied by the DSD;

enqueue the batch of commands in a queue at the host to sequentially send the commands from the host to the DSD, wherein the command is enqueued in the queue with the one or more conditions for performing the command;

determine whether the one or more conditions have been satisfied by the DSD before sending the command to the DSD; and in response to determining that the one or more conditions have been satisfied by the DSD, send the command in sequence from the queue to the DSD for performance of the command.

17. The non-transitory computer-readable storage medium of claim 16, wherein when the computer-executable instructions are executed by the processor of the host, the computer-executable instructions further cause the host to enqueue at least one additional command received from the at least one application while the command and the one or more conditions remain enqueued.

18. The non-transitory computer-readable storage medium of claim 16, wherein when the computer-executable instructions are executed by the processor of the host, the computer-executable instructions further cause the host to monitor a queue status of the DSD to determine whether a condition of the one or more conditions has been satisfied.

19. The non-transitory computer-readable storage medium of claim 16, wherein the one or more conditions provide that a DSD queue at the DSD of pending commands to be performed by the DSD is empty.

20. The non-transitory computer-readable storage medium of claim 16, wherein the one or more conditions provide that a number of pending commands at the DSD is less than or equal to a predetermined number of pending commands.

\* \* \* \* \*